(12) United States Patent
Dolezilek et al.

(10) Patent No.: US 9,705,305 B2
(45) Date of Patent: Jul. 11, 2017

(54) RESILIENT COMMUNICATION FOR AN ELECTRIC POWER DELIVERY SYSTEM

(71) Applicant: Schweitzer Engineering Laboratories, Inc., Pullman, WA (US)

(72) Inventors: David J. Dolezilek, Pullman, WA (US); Amandeep Singh Kalra, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 636 days.

(21) Appl. No.: 14/265,018

(22) Filed: Apr. 29, 2014

(65) Prior Publication Data

US 2015/0311714 A1 Oct. 29, 2015

(51) Int. Cl.
G05D 11/16 (2006.01)
H02H 1/00 (2006.01)
H02J 13/00 (2006.01)

(52) U.S. Cl.
CPC ....... H02H 1/0061 (2013.01); H02J 13/0013 (2013.01); *Y02E 60/724* (2013.01); *Y02E 60/7807* (2013.01); *Y04S 10/18* (2013.01); *Y04S 40/12* (2013.01)

(58) Field of Classification Search
None
See application file for complete search history.

(56) References Cited

U.S. PATENT DOCUMENTS

| | | | | |
|---|---|---|---|---|
| 6,633,823 B2 * | 10/2003 | Bartone | ................... | H02J 3/14 700/295 |
| 7,283,916 B2 * | 10/2007 | Cahill-O'Brien | ...... | G06Q 50/06 324/110 |
| 7,715,887 B2 * | 5/2010 | Cloutier | .................. | F41H 11/00 340/870.07 |
| 8,190,381 B2 | 5/2012 | Spanier | | |
| 8,331,855 B2 | 12/2012 | Williams | | |
| 2004/0162642 A1 | 8/2004 | Gasper | | |

(Continued)

OTHER PUBLICATIONS

PCT/US2015/022795 Patent Cooperation Treaty, International Search Report and Written Opinion of the International Searching Authority, Jun. 19, 2015.

*Primary Examiner* — Evral E Bodden
(74) *Attorney, Agent, or Firm* — Stoel Rives, LLP; Richard M. Edge (57) ABSTRACT

A system for resiliently monitoring an electric power delivery system may include a plurality of server intelligent electronic devices (IEDs) configured to monitor and/or control the electric power delivery system. Each server IED may be communicatively coupled to a client control system by a plurality of communication paths. If a communication path fails, communication may continue along another path. In an embodiment, the client control system may include dual primary client controllers that continually request information from the server IEDs using multiple of the communication paths. The client controllers may request information from each other if the information is not received from the server IEDs, for example, due to a communication failure. In an embodiment, the client control system and server IEDs may be communicatively coupled in a loop topology, and each direction around the loop may be a distinct communication path.

22 Claims, 6 Drawing Sheets

(56) References Cited

U.S. PATENT DOCUMENTS

| | | |
|---|---|---|
| 2009/0070447 A1 | 3/2009 | Jubinville |
| 2009/0112375 A1 | 4/2009 | Popescu |
| 2010/0222094 A1* | 9/2010 | Usuda ................... H04L 1/0057 455/522 |
| 2011/0035076 A1* | 2/2011 | Schweitzer, III ... H02J 13/0062 700/296 |
| 2013/0031201 A1 | 1/2013 | Kagan |
| 2014/0068711 A1 | 3/2014 | Schweitzer |

* cited by examiner

FIG. 5 ly by radios. However, if# RESILIENT COMMUNICATION FOR AN ELECTRIC POWER DELIVERY SYSTEM

TECHNICAL FIELD

This disclosure relates to systems and methods for providing resilient communication for an electric power delivery system.

DETAILED DESCRIPTION OF PREFERRED EMBODIMENTS

An electric power delivery system may have numerous monitoring devices for monitoring and controlling various aspects of the electric power delivery system. The monitoring devices may collect monitored system data from the electric power delivery system. One or more monitoring devices may be Intelligent Electronic Devices (IEDs) configured as servers. A client automation controller may aggregate data from a plurality of server IEDs. The client automation controller may perform mathematical and/or logical calculations on the aggregated data and/or may concentrate the data. The client automation controller may transmit calculation results and/or concentrated data to a central monitoring system, where it can be reviewed by an operator, stored for later analysis, and/or the like.

The client automation controller may be communicatively coupled to the server IEDs wirelessly by radios. However, if a radio ceases to function and/or a wireless coupling between radios is degraded, noisy, and/or obstructed, the client automation controller may be unable to collect monitored system data from a now uncoupled server IED. Moreover, if the uncoupled server IED repeats requests for monitored system data to other server IEDs out of range of the client automation controller, the client automation controller may be unable to collect the monitored system data from the other server IEDs. Accordingly, there is a need for a monitoring system that is fault-tolerant and that allows requests for monitored system data to be repeated to server IEDs out of range of the client automation controller.

In an embodiment, a system for providing resilient monitoring of an electric power delivery system may include a client control system, which may include a client automation controller and/or a plurality of client automation controllers (e.g., a first client controller and a second client controller). First and second client radios may be communicatively coupled to the client control system to wirelessly transmit communications from the client control system. For example, the first client radio may be communicatively coupled to the first and second client controllers, and the second client radio may be communicatively coupled to the first and second client controllers. Alternatively, the first client radio may be communicatively coupled to the first client controller, and the second client radio may be communicatively coupled to the second client controller.

The system may include a plurality of server IEDs. Each server IED may be communicatively coupled to first and second server radios (e.g., a server radio pair). The first and second server radios may be communicatively coupled with each other directly and/or through the server IED (e.g., by one or more wires). The first and second server radios may be configured to repeat communications received by each other. For example, the second server radio may provide received communications to the first server radio, which may repeat some and/or all of the provided communications and vice versa. In an embodiment, the first and second server radios may repeat all communications regardless of destination. Alternatively, only communications that are not destined for the server IED to which the server radios are communicatively coupled may be repeated. The server radio pair may coordinate transmission time, reception time, and/or frequencies to avoid interfering with each other, and/or may use a protocol configured to prevent conflicts without coordination. Communications from the client controller may be transmitted using a multi-drop protocol, so the communications may be delivered to every server IED and only the addressed server IED may respond. Accordingly, little or no decision making may need to be performed by the radios when repeating communications.

Each server radio may be communicatively coupled to at least one other radio at another site (e.g., a server radio directly communicatively coupled to a radio of another server IED and/or the client control system). The server radios may be communicatively coupled to create a plurality of communication paths between the client control system and each server IED. Each communication path may correspond to a data channel. In an embodiment, the server radios may be configured in a loop topology. The loop topology may allow each server IED to be reached in both directions around the loop. If a radio fails or a wireless coupling is obstructed, every server IED may still be reachable. Additionally, communications transmitted one direction around the loop may be able to reach each server IED only via one communication path, so routing may be simple without any concern that duplicate messages may unintentionally reach a server IED. Additionally, the loop topology may be well suited for the layout of many electric power delivery systems (e.g., the physical locations of the server IEDs may be similar to the path of the distribution circuit).

The communicative coupling between radios at different sites may include a plurality of data channels, which may be multiplexed together by the radios (e.g., time-division, frequency-division, code-division, space-division, etc. multiplexing). For example, each radio may include a plurality of ports and independent communications and/or protocols may be provided on each port. The communications received via the ports may be multiplexed together by the radio and transmitted over a single wireless coupling (e.g., a single radio channel). The server IED may include a plurality of ports coupled to the plurality of ports of the radios. The server IED may be configured to respond to each communication using the data channel on which the communication was received. In addition, the responses may be transmitted back in the direction from which they were received. For example, if a client controller transmits a request for data clockwise, the response may be transmitted back to the client controller counter-clockwise. The server radios may repeat each communication on a data channel corresponding to the data channel on which the communication was received so the data channels remain independent and routing is simple.

The first and second client controllers may be configured to transmit in both directions around a loop topology and/or may each transmit in only one direction around the loop topology. Each direction around the loop may be associated with a data channel (e.g., a first loop direction with a first data channel and a second loop direction with a second data channel). The first and second client controllers may be dual primaries; each client may collect data from all server IEDs and/or control all server IEDs. If one of the client controllers determines that no response is received for a request transmitted to one or more of the server IEDs, the client controller may request the needed data from the other client controller. Accordingly, the client controllers, server radio pairs, and server IEDs may not need to detect where a failure has occurred, and routing does not need to be changed in response to the failure.

The client controllers may continue to poll the server IEDs and retrieve missing data from the other client controller until the coupling is restored. Because routing may be simple during normal operation and no change in routing may be required for a failure, the radios, IEDs, and controllers may not need advanced routing capabilities and components from existing systems be easily reconfigured to implement the system. In some embodiments, more complicated routing may be used before or after a failure (e.g., selecting a shortest path), and/or each client controller may be able to transmit along multiple communication paths to a single server IED.

The server radio pairs may be configured so that each server IED may be directly communicatively coupled to a first neighbor by the first server radio and to a second neighbor by the second server radio (e.g., to form a loop topology or another topology). The first server radio at each server IED may relay communications received from the first neighbor to the second server radio for transmission to the second neighbor so the communications may be propagated to all the server IEDs. Thus, some server IEDs may be too far from the client controllers for direct communicative coupling. The relaying may allow server IEDs to be placed in locations that have been conventionally considered too far away to have server IEDs. In some embodiments, a server IED may include more than two radios and/or may be coupled to more than two neighbors. In an embodiment with a server IED with more than two directly coupled neighbors, messages may be routed and/or some radios may only include one data channel to prevent duplicate messages from reaching the same server IED.

In an embodiment, one or more data channels may include a supervisory control and data acquisition (SCADA) protocol, such as the Distributed Network Protocol (DNP3), Modbus, PROFIBUS, International Electrotechnical Commission (IEC) 61850, International Electrotechnical Commission (IEC) 60870-5, etc. For example, the client controller may be configured as a DNP3 multi-drop client (e.g., a DNP3 master) with the server IEDs configured as DNP3 slaves. Alternatively, or in addition, different SCADA and/or non-SCADA protocols may be used on each data channel. In some embodiments, one or more additional logical channels may allow control commands, engineering access, relay event collection, etc. to be provided to the server IEDs. The system may provide redundancy to data channels, control channels, engineering access channels, relay event collection channels, channels carrying multiple communication types, and/or the like. The radios may be configured to have sufficient logical channels to support the number of data types and amount of redundancy desired (e.g., two channels, one for each loop direction, for each logical channel requiring redundancy).

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations. In addition, the terms "comprising" and "including" are open ended and even may allow for the inclusion of elements similar to recited elements but having different characteristics and/or configurations.

Several aspects of the embodiments described will be illustrated as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable storage medium having stored thereon instructions that may be used to program a computer (or other electronic device) to perform processes described herein. The machine-readable storage medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Figure 1:
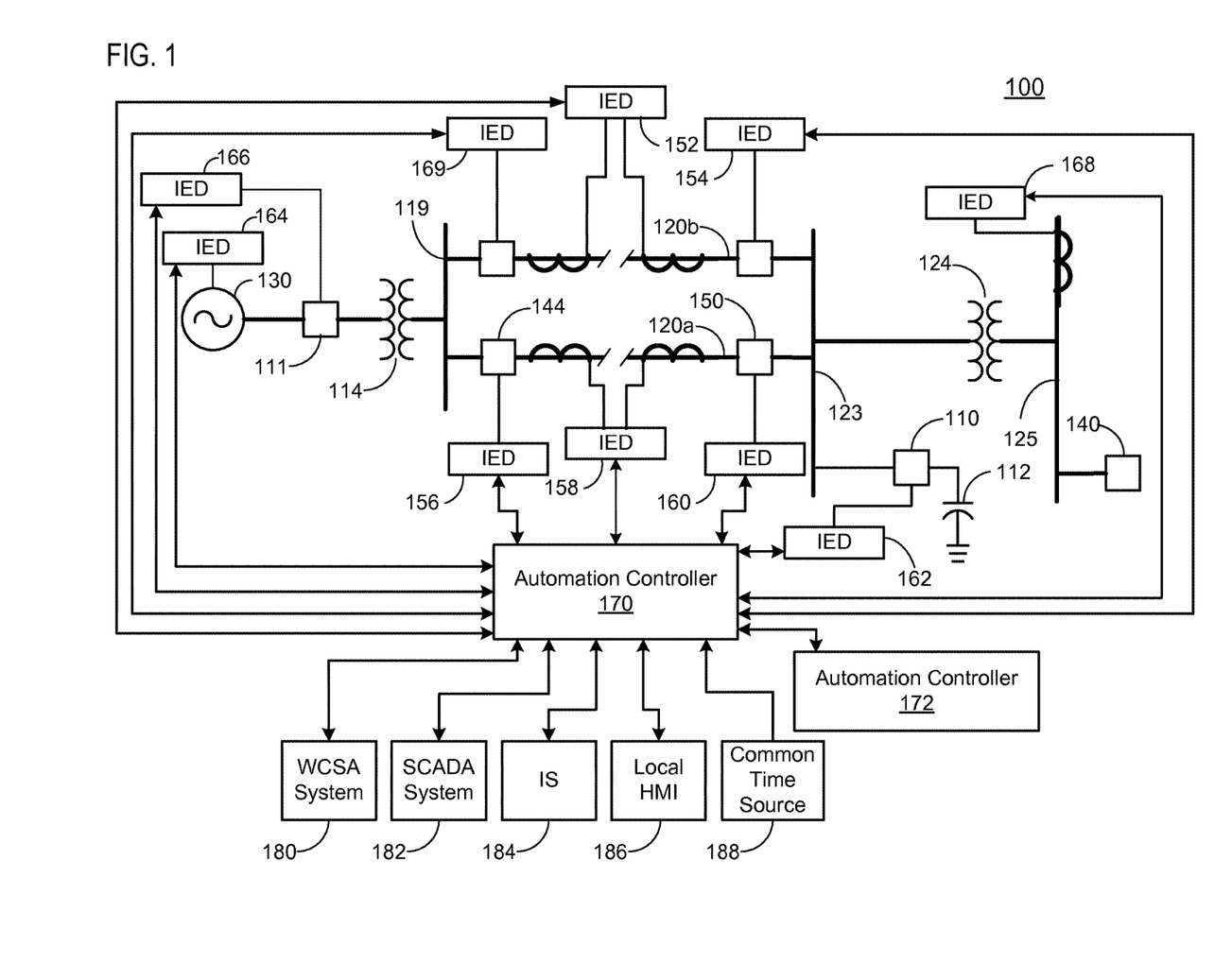
FIG. 1 illustrates a simplified one-line diagram of an electric power delivery system.

FIG. 1 illustrates a simplified one-line diagram of an electric power delivery system 100. Although illustrated as a one-line diagram, the electric power delivery system 100 may represent a three phase power system. FIG. 1 illustrates a single phase system for simplicity.

The electric power delivery system 100 includes, among other things, a generator 130, configured to generate a sinusoidal waveform. A step-up power transformer 114 may be configured to increase the generated waveform to a higher voltage sinusoidal waveform. A first bus 119 may distribute the higher voltage sinusoidal waveform to transmission lines 120a and 120b, which in turn connect to a second bus 123. Breakers 144, 150, 110, and 111, may be configured to be selectively actuated to reconfigure the electric power delivery system 100. For example, one breaker 110 may selectively connect a capacitor bank 112 to the second bus 123 to maintain a proper balance of reactive power. A step-down power transformer 124 may be configured to transform the higher voltage sinusoidal waveform to lower voltage sinusoidal waveform that is suitable for delivery to a load 140.

IEDs 152-169, shown in FIG. 1, may be configured to control, monitor, protect, and/or automate the electric power system 100. As used herein, an IED may refer to any microprocessor-based device that monitors, controls, automates, and/or protects monitored equipment within an electric power system. Such devices may include, for example, remote terminal units, differential relays, distance relays, directional relays, feeder relays, overcurrent relays, voltage regulator controls, voltage relays, breaker failure relays, generator relays, motor relays, automation controllers (e.g., client automation controllers), bay controllers, meters, recloser controls, communications processors, computing platforms, programmable logic controllers (PLCs), programmable automation controllers, input and output modules, motor drives, and the like. The IEDs 152-169 may gather status information from one or more pieces of monitored equipment. The IEDs 152-169 may receive information concerning monitored equipment using sensors, transducers, actuators, and the like.

The IEDs 152-169 may also gather and transmit information gathered about monitored equipment. Although FIG. 1 shows separate IEDs monitoring a signal (e.g., 158) and controlling a breaker (e.g., 160) these capabilities may be combined into a single IED. FIG. 1 shows various IEDs performing various functions for illustrative purposes and does not imply any specific arrangements or functions required of any particular IED. IEDs may be configured to monitor and communicate information, such as voltages, currents, equipment status, temperature, frequency, pressure, density, infrared absorption, radio-frequency information, partial pressures, viscosity, speed, rotational velocity, mass, switch status, valve status, circuit breaker status, tap status, meter readings, and the like. IEDs may also be configured to communicate calculations, such as phasors (which may or may not be synchronized to a common time source as synchrophasors), relay events (e.g., a permanent fault, a temporary fault, an overcurrent condition, an undervoltage condition, a high temperature condition, an inrush condition, a backfeed condition, direction of current flow, loss of potential, a switching transient, a system overload, an exceeded load profile, etc.), relay event data corresponding to a relay event (e.g., graphic waveform data, such as voltages and/or currents, associated with the relay event), fault distances, differentials, impedances, reactances, frequency, and the like. IEDs may also communicate settings information, IED identification information, communications information, status information, alarm information, and the like. Information of the types listed above, or more generally, information about the status of monitored equipment is referred to as monitored system data. Each IED may generate monitored system data regarding properties of the electric power delivery system at points proximate to the IED.

The IEDs 152-169 may also issue control instructions to the monitored equipment in order to control various aspects relating to the monitored equipment. For example, an IED may be in communication with a circuit breaker, and may be capable of sending an instruction to open and/or close the circuit breaker, thus connecting or disconnecting a portion of a power system. In another example, an IED may be in communication with a recloser and capable of controlling reclosing operations. In another example, an IED may be in communication with a voltage regulator and capable of instructing the voltage regulator to tap up and/or down. Other examples of control instructions that may be implemented using IEDs may be known to one having skill in the art, but are not listed here. Information of the types listed above, or more generally, information or instructions directing an IED or other device to perform a certain action are referred to as control instructions.

The IEDs 152-169 may be linked together using a data communications network, and may further be linked to a central monitoring system, such as a SCADA system 182, an information system (IS) 184, or a wide area control and situational awareness (WCSA) system 180. The embodiment of FIG. 1 illustrates a star topology having an automation controller 170 at its center; however, other topologies are also contemplated. For example the IEDs 152-169 may be connected directly to the SCADA system 182 or the WCSA system 180. The data communications network of FIG. 1 may include a variety of network technologies, and may comprise network devices such as modems, routers, firewalls, virtual private network servers, and the like. The IEDs and other network devices may be connected to the communications network through a network communication interface.

The IEDs 152-169 are connected at various points to the electric power delivery system 100. A first IED 152 may be configured to monitor conditions on a first transmission line 120b, while a second IED 158 may monitor conditions on a second transmission line 120a. A plurality of breaker IEDs 154, 156, 160, and 169 may be configured to issue control instructions to associated breakers. A third IED 168 may monitor conditions on a third bus 125. A fourth IED 164 may monitor and issue control instructions to a generator 130, while a fifth IED 166 may issue control instructions to a breaker 111.

In certain embodiments, including the embodiment illustrated in FIG. 1, communication among various IEDs and/or higher level systems (e.g., the SCADA system 182 or the IS 184) may be facilitated by the automation controller 170. The automation controller 170 may also be referred to as a central IED, access controller, or client controller. In various embodiments, the automation controller 170 may be embodied as the SEL-2020, SEL-2030, SEL-2032, SEL-3332, SEL-3378, or SEL-3530 available from Schweitzer Engineering Laboratories, Inc. of Pullman, Wash., and also as described in U.S. Pat. Nos. 5,680,324, 7,630,863, and U.S. Patent Application Publication No. 2009/0254655, the entireties of which are incorporated herein by reference.

Centralizing communications in the electric power delivery system 100 using the automation controller 170 may provide the ability to manage a wide variety of IEDs in a consistent manner. The automation controller 170 may be capable of communicating with IEDs of various types and using various communications protocols. The automation controller 170 may provide a common management interface for managing connected IEDs, thus allowing greater uniformity and ease of administration in dealing with a wide variety of equipment. It should be noted that although an automation controller 170 is used in this example, any such device may be used in place of the automation controller 170. For example, an IED, programmable logic controller, computer, or the like may be used. Any such device is referred to herein as a client control system.

In various embodiments, devices within the electric power delivery system 100 may be configured to operate in a peer-to-peer configuration. In such embodiments, the client control system may be selected from among the available peer devices. Further, the device designated as the client control system may be changed. Such changes may occur as a result of losing communication with a device previously selected as a client control system, as a result of a change in the configuration of electric power delivery system 100, the detection of a specific condition triggering time coordinated action by an IED that is not designated as the client control system at the time of the occurrence of the condition, or under other circumstances.

The IEDs 152-169 may communicate information to the automation controller 170 including, but not limited to status and control information about the individual IEDs, IED settings information, calculations made by individual IEDs, event (fault) reports, communications network information, network security events, and the like. The automation controller 170 may be in communication with a second automation controller 172, in order to increase the number of connections to pieces of monitored equipment, to extend communication to other electric power delivery systems, and/or to provide redundancy. In alternative embodiments, the automation controller 170 may be directly connected to one or more pieces of monitored equipment (e.g., the generator 130 or the breakers 111, 144, 150, 110).

The automation controller 170 may also include a local human machine interface (HMI) 186. Alternatively, or in addition, the automation controller 170 may be removeably coupleable to a human machine interface, such as a laptop, tablet, cell phone, or the like, through a wireless and/or wired connection, and/or the automation controller 170 may provide a remote human machine interface, such as a remotely accessible, internet-browser-renderable platform over an internet protocol (IP) network. The local HMI 186 may be located at the same substation as the automation controller 170. The local HMI 186 may be used to change settings, issue control instructions, retrieve an event (fault) report, retrieve data, and the like. In this structure, the automation controller 170 may include a programmable logic controller accessible using the HMI 186.

The automation controller 170 may also be connected to a common time source 188. In certain embodiments, the automation controller 170 may generate a common time signal based on the common time source 188 that may be distributed to the connected IEDs 152-169. Based on the common time signal, various IEDs may be configured to collect time-aligned data points, including synchrophasors, and to implement control instructions in a time coordinated manner. The WCSA system 180 may receive and process the time-aligned data, and may coordinate time synchronized control actions at the highest level of the power system. In another embodiment, the automation controller 170 may not receive a common time signal, but a common time signal may be distributed to the IEDs 152-169.

The common time source 188 may also be used by the automation controller 170 for time stamping information and data. Time synchronization may be helpful for data organization, real-time decision-making, as well as post-event analysis. Time synchronization may further be applied to network communications. The common time source 188 may be any time source that is an acceptable form of time synchronization, including but not limited to a voltage controlled temperature compensated crystal oscillator, a Rubidium and/or Cesium oscillator with or without a digital phase locked loop, MEMs technology, which transfers the resonant circuits from the electronic to the mechanical domains, or a GPS receiver with time decoding. In the absence of a discrete common time source, the automation controller 170 may serve as the time source by distributing a time synchronization signal (received from one of the sources described).

Figure 2:
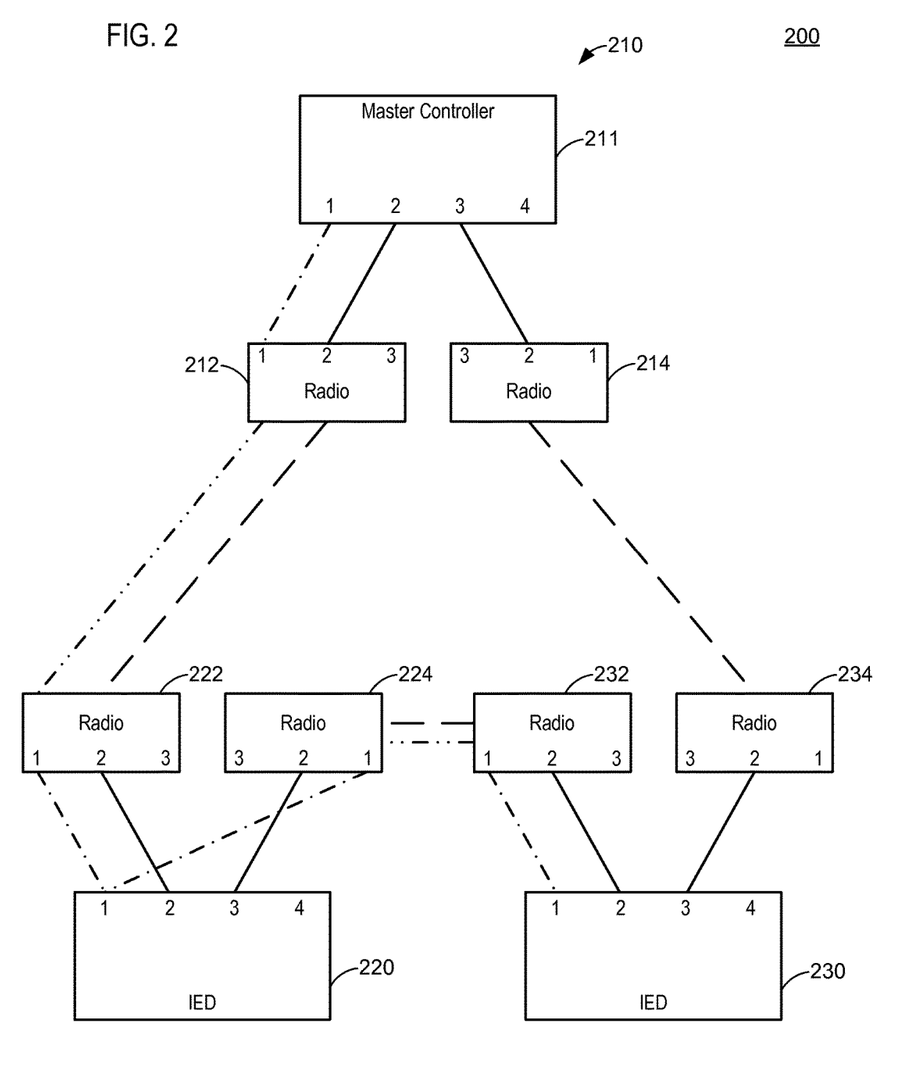
FIG. 2 is a schematic diagram of a system for providing resilient communications between a client control system and a plurality of IEDs.

FIG. 2 is a schematic diagram of a system 200 for providing resilient communications between a client control system 210 and a plurality of IEDs 220, 230. In the illustrated embodiment, the client control system 210 includes a single client controller 211. The client control system 210 may be communicatively coupled to first and second client radios 212, 214. For example, a first port of the client control system 210 may be communicatively coupled to a first port of the first client radio 212; a second port of the client control system 210 may be communicatively coupled to a second port of the first client radio 212; and a third port of the client control system 210 may be communicatively coupled to a second port of the second client radio 214. A first server IED 220 may include corresponding first and second server radios 222, 224, and a second server IED 230 may also include corresponding first and second server radios 232, 234. In alternate embodiments, there may be more than two client radios 212, 214 and/or more than two server radios 222, 224, 232, 234 per server IED 220, 230.

The client and server radios 212, 214, 222, 224, 232, 234 may be communicatively coupled to each other in a loop. The loop may include a plurality of data channels, such as a first data channel depicted with a dashed double dotted line and a second data channel depicted with a dashed line. In the illustrated embodiment, the first data channel may be configured to transport requests from the client control system 210 around the loop in a counter-clockwise direction and the second in a clockwise direction. Responses from the server IEDs 220, 230 may be transported around the loop in the opposite direction as the requests from the client control system 210. The final link connecting providing a data channel back to the client control system 210 may be left out in some embodiments (e.g., the link for the first data channel between the second server radio 234 of the second server IED 230 and the second client radio 214). Alternatively, or in addition, a loop may circle all the way back to the client control system 210 to allow communications to be returned thereto (e.g., in the illustrated embodiment, the second channel includes a complete loop). The first and second data channels may be consistent around the entire loop to ensure the topology of the loop is correct. The first and second channels may carry monitored system data, carry control information, provide engineering access, allow for relay event collection, and/or the like. The third channel may carry similar information to the first and second channels and/or a different type of information. For example, the first and second channels may carry monitored system data and the third channel may carry control information in an embodiment. Many other combinations are also contemplated.

The server radios 222, 224, 232, 234 may be configured to repeat communications received by each other. For example, the client control system 210 may transmit to the first server radio 222 of the first IED 220 a request for information intended for the second IED 230. The first server radio 222 may provide the request for information to the second server radio 224 of the first IED 220, which may transmit the request for information to the first server radio 232 of the second IED 230. The second IED 230 may respond to the request for information back in the direction from which the request was received (e.g., the response may also be repeated by the first and second server radios 222, 224 of the first IED 220). The server radios 222, 224, 232, 234 of each server IED 220, 230 may be directly coupled to each other, and/or the server IEDs 220, 230 may transfer communications between the server radios. In the illustrated embodiment, the first and second server radios 222, 224 of the first server IED 220 may have their first ports directly coupled to each other and to the first port of the first server IED 220 (e.g., each communication may be transmitted directly to both the first server IED 220 and the other server radio 222, 224). In the illustrated embodiment, the first and second server radios 222, 224 of the first server IED 220 may have their second ports coupled to each other via the second and third ports of the first server IED 220. The first server IED 220 may forward communications between the second ports of the first and second server radios 222, 224. The first server IED 220 may forward the communications only if they are not addressed for the first server IED 220.

The client control system 210 may determine whether a response is received to a request for information. If no response has been received, the client control system 210 may attempt to retrieve the requested information another way. If the client control system 210 includes multiple automation controllers, an automation controller that did not receive a response to a request may attempt to acquire the information from another automation controller. Alternatively, or in addition, the client control system 210 may transmit the request again in an opposite direction around the loop. The client control system 210 may attempt to transmit additional requests for information in the original direction until any failures in the loop are remedied. In an embodiment with a complete loop, the client control system 210 may evaluate the status of the loop by determining whether messages circumnavigate the entire loop. The client control system 210 may adjust which direction requests will be transmitted around the loop based on the status evaluation.

Figure 3A:
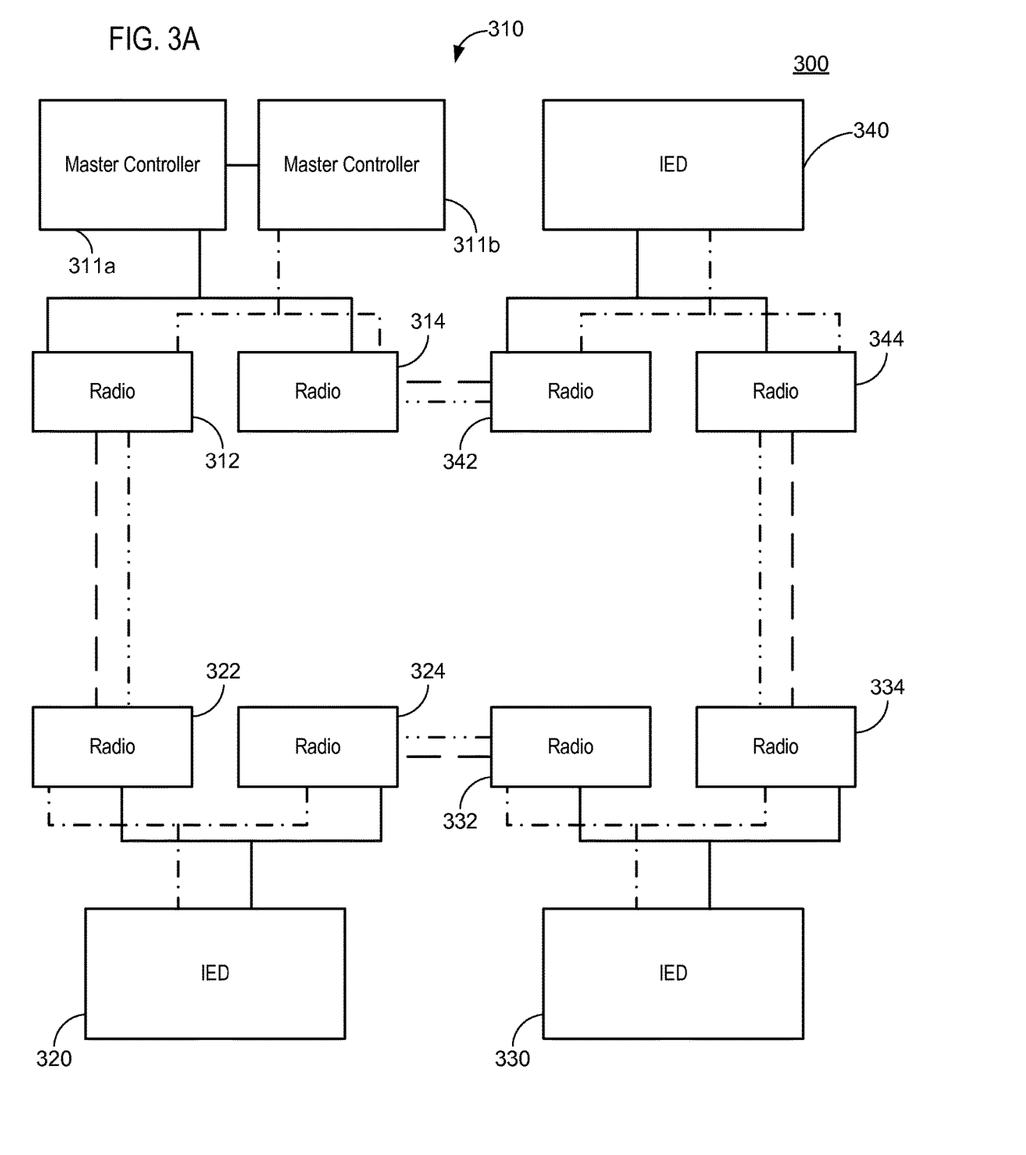
FIG. 3A is a schematic diagram of a system for providing resilient communications between a client control system and a plurality of IEDs.
Figure 3B:
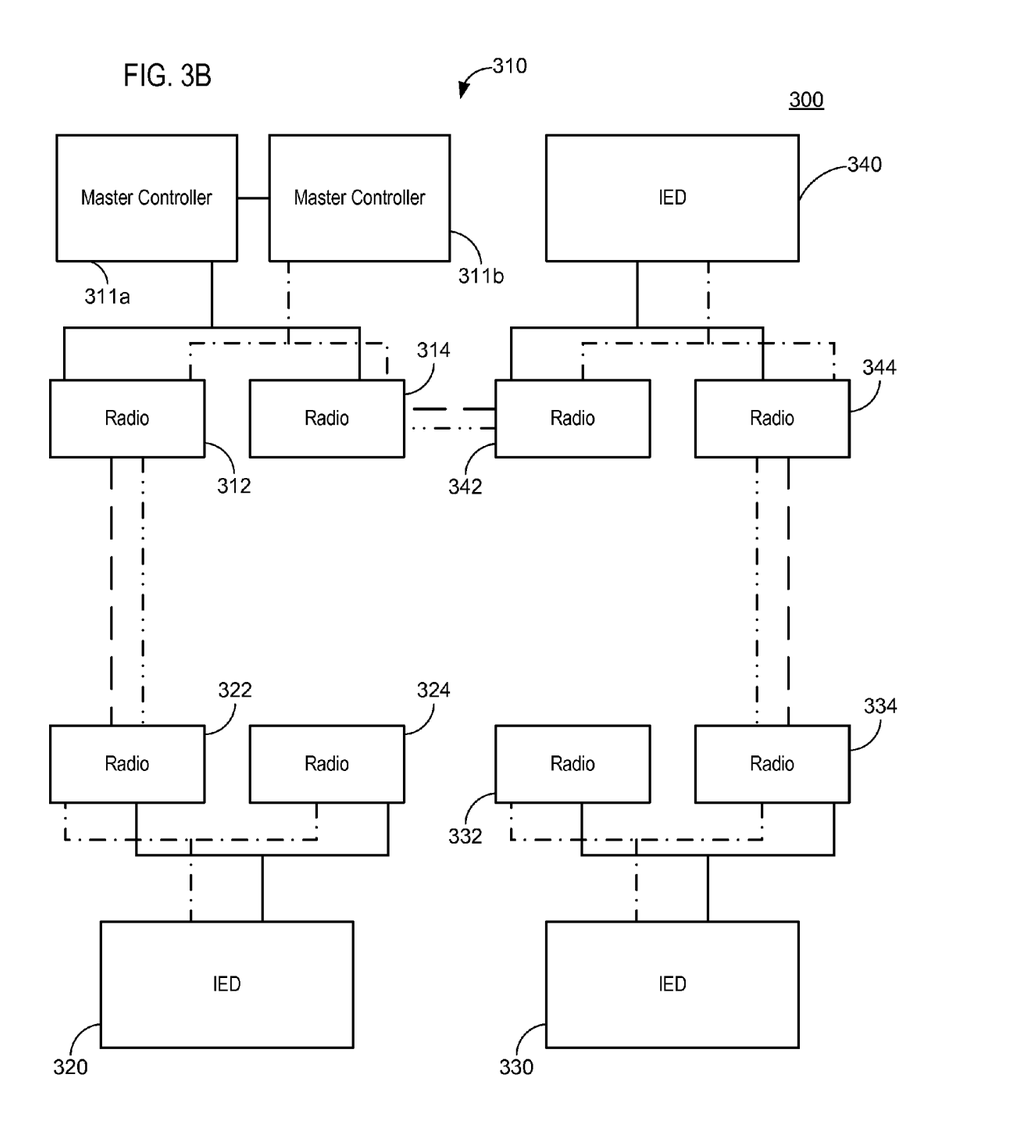
FIG. 3B is a schematic diagram of a system for providing resilient communications that has experienced a failure.

FIGS. 3A and 3B are schematic diagrams of a system 300 for providing resilient communications between a client control system 310 and a plurality of IEDs 320, 330, 340. The client control system may include a pair of client controllers 311a, 311b, which may be communicatively coupled to each other. In the illustrated embodiment, the first and second client controllers 311a, 311b may be each communicatively coupled to first and second client radios 312, 314. In alternate embodiments, each client controller 311a, 311b may be coupled to only one client radio 312, 314. The plurality of server IEDs 320, 330, 340 may each be coupled to a pair of server radios 322, 324, 332, 334, 342, 344. The radios within each radio pair 322, 324, 332, 334, 342, 344 may be communicatively coupled to each other as well.

The client control system 310 and plurality of server IEDs 320, 330, 340 may be communicatively coupled in a loop topology by the radios 312, 314, 322, 324, 332, 334, 342, 344. For example, a second server IED 330 may be communicatively coupled to the client control system 310 through first and third server IEDs 320, 340. The couplings between radios within a radio pair 312, 314, 322, 324, 332, 334, 342, 344 and with the client controller 311a, 311b and/or the server IEDs 320, 330, 340 (e.g., the couplings illustrated by solid lines and single dot single dash lines) may include wired connections. The communicative couplings between different radio pairs 312, 314, 322, 324, 332, 334, 342, 344 may include wireless couplings.

The client controllers 311a, 311b may use the first client radio 312 to transmit requests for information in a counter-clockwise direction around the loop and may use the second client radio 314 to transmit requests for information in a clockwise direction around the loop. In an embodiment, the first client controller 311a may only transmit counter-clockwise requests for information, and the second client controller 311b may only transmit clockwise requests for information.

As shown in FIG. 3B, a break in the loop may occur, for example, between a second server radio 324 of the first server IED 320 and a first server radio 332 of the second server IED 330. If the first client controller 311a transmits a request for information from the second server IED 330 counter-clockwise, the request may never reach the second server IED 330 and the first client controller 311a may not receive a response. The first client controller 311a may determine that a response has not been received and may request the missing information from the second client controller 311b. The second client controller 311b may have previously received the missing information by transmitting a request for information clockwise. The second client controller 311b may provide the previously received information to the first client controller.

The first and second client controller 311a, 311b may be dual primaries that continually request information from the server IEDs 320, 330, 340 to keep a complete updated record. When either client controller 311a, 311b is missing any information, it may request that information from the other client controller 311a, 311b. In an embodiment, the client controller 311a, 311b may continue to request information directly from the server IEDs 320, 330, 340 each time it is needed and determine no response is received before requesting the information from the other client controller 311a, 311b. In some embodiments, the client controller 311a, 311b may determine that a communication failure has occurred and report the communication failure. For example, the client controller 311a, 311b may determine whether a request for information travels around the entire loop and/or if no response is received but the other client controller 311a, 311b has the desired information.

Figure 4:
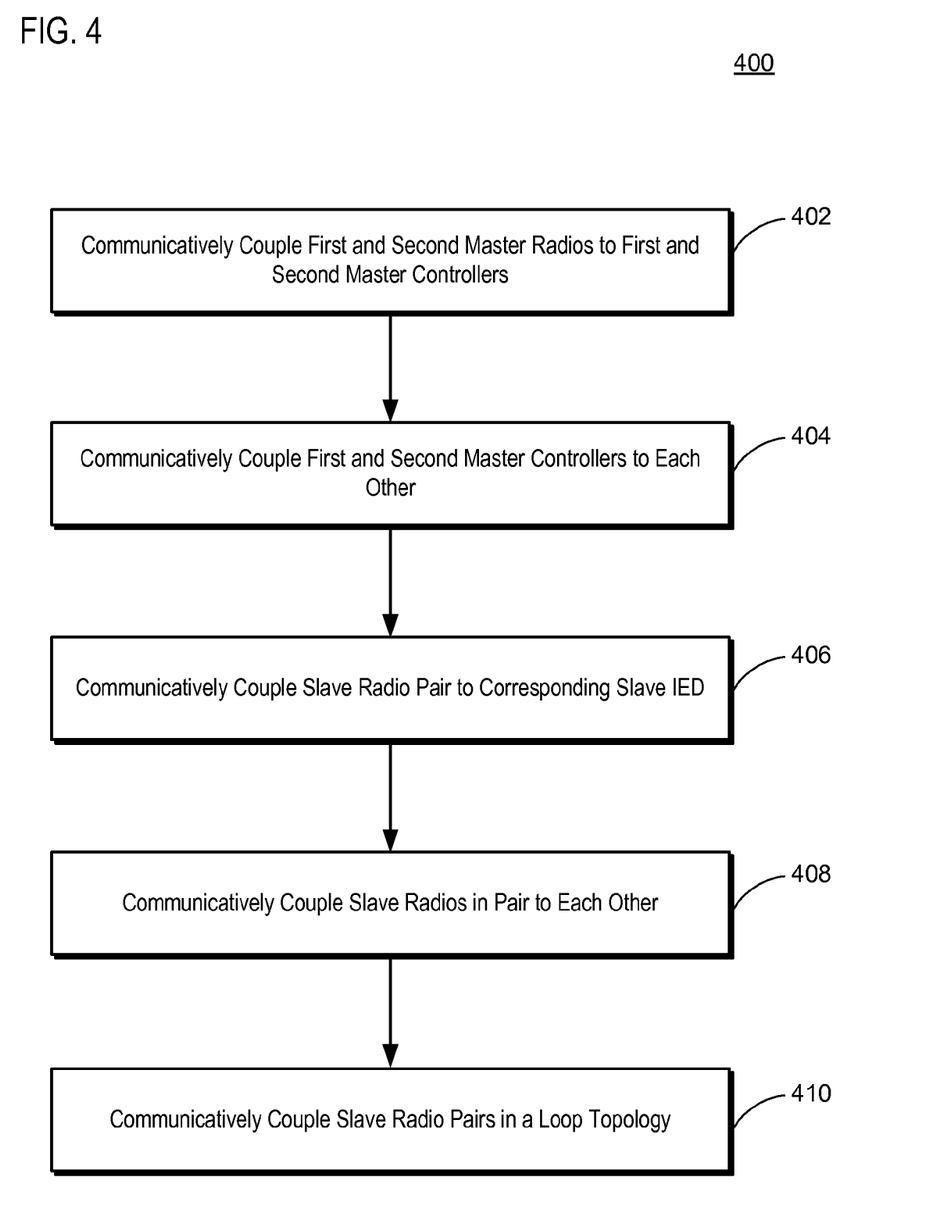
FIG. 4 is a flow diagram of a method for setting up a resilient communication network for monitoring an electric power delivery system.

FIG. 4 is a flow diagram of a method 400 for setting up a resilient communication network for monitoring an electric power delivery system. Although the steps of the method 400 are depicted sequentially, numerous orders for the steps are possible, and/or some or all of the steps may be performed simultaneously and/or may overlap in time. The method 400 may include communicatively coupling 402 first and second client radios to first and second client controllers. For example, wires, such as RS-232, RS-485, etc., may be used to communicatively couple the client controllers to the client radios. The client controllers may each be coupled to a single client radio and/or coupled to both client radios. The client radios similarly may each be coupled to a single client controller and/or to both client controllers. The first and second client controller may be communicatively coupled 404 to each other. The first and second client controllers may be communicatively coupled by wires and/or wirelessly. The first and second client controller may or may not be co-located.

A plurality of server radio pairs may be communicatively coupled 406 to a corresponding plurality of server IEDs. In an embodiment, a server IED may be communicatively coupled to a corresponding server radio pair by wires. Although the illustrated embodiment includes a pair of server radios for each server IED, more than two server radios may be included in alternate embodiments. The server radios and/or client radios may be transparent to the corresponding server IED and/or client controller, so the server IEDs and/or client controllers may communicate as if directly wired to each other. The radios may determine how to encapsulate and transmit received communications. The server radios within each server radio pair may be communicatively coupled 408 to each other. The server radios may be communicatively coupled directly to each other, e.g., using wires, and/or the server radios may be communicatively coupled to a server IED. In an embodiment, communicatively coupling 408 the server radios to each other may include configuring the server IED to repeat communications from one server radio to the other.

The server radio pairs may be communicatively coupled 410 in a loop topology. Each server radio pair may be communicatively coupled to two or more neighbors to form a loop. One or more server radio pairs may be communicatively coupled to the client radios to form the loop. The loop may be closed and/or a final link may be missing from the loop for one or more data channels. The radio pairs may be communicatively coupled 410 using the wireless transmission and receiving functions of the server radios to transmit and receive communications. The radios may be configured to communicate using one or more data channels, so communicative coupling may include ensuring the data channels remain consistent throughout the entire loop. The loop may be configured to follow the layout of an electric power delivery system. Portions of the electric power delivery system farther from the client controllers (e.g., farther than a range of the radios) may be monitored by server IEDs communicatively coupled by a plurality of communication links in each direction. Once the method 400 has been completed, the first and second client controllers may be able to request data from the server IEDs or from each other if a communication fails.

Figure 5:
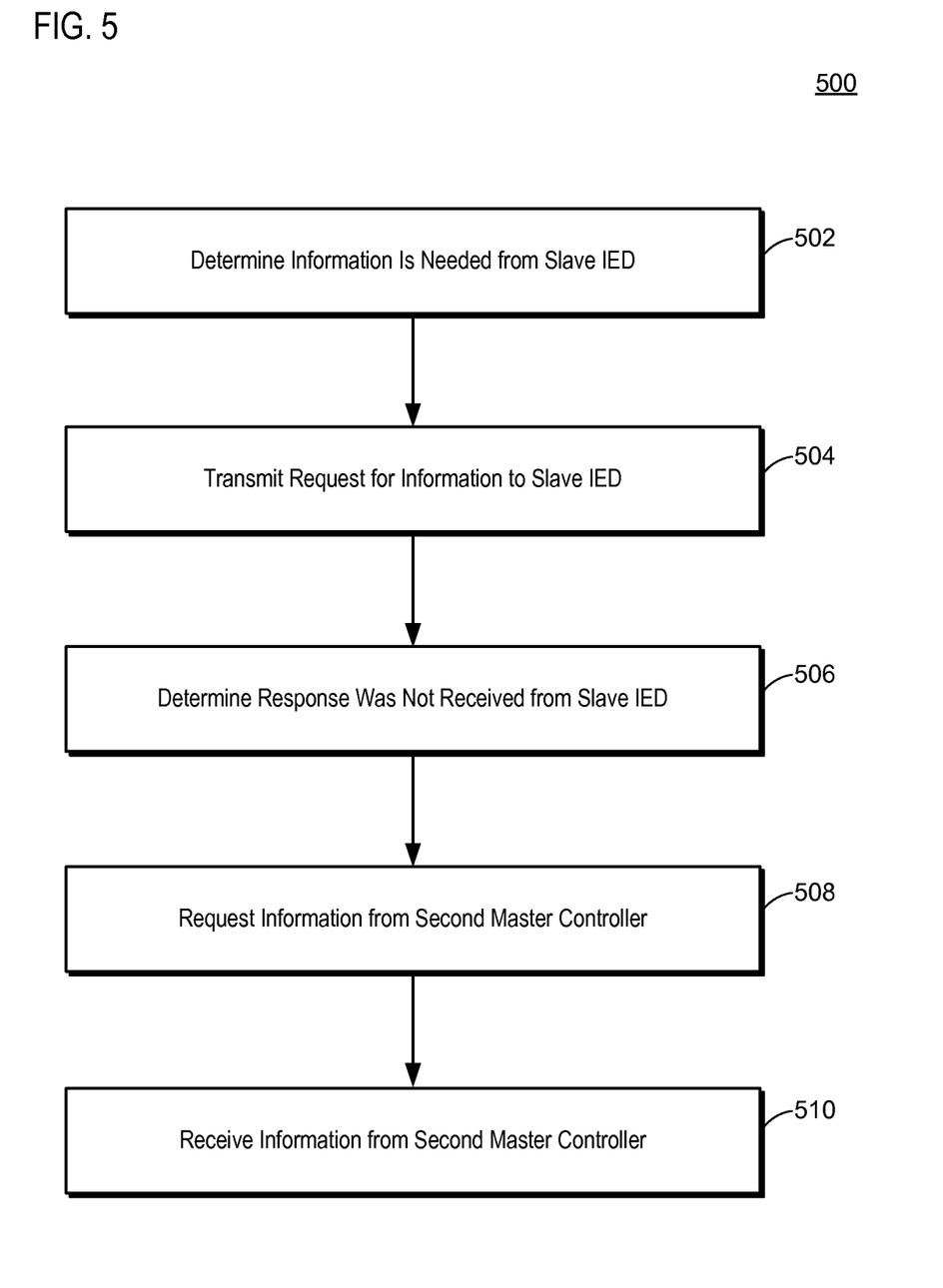
FIG. 5 is a flow diagram of a method for retrieving information from server IEDs on a resilient communication network.

FIG. 5 is a flow diagram of a method 500 for retrieving information from server IEDs on a resilient communication network. The method 500 may begin when it is determined 502 that information is needed from a server IED. For example, the information may include monitored system data, such as a synchrophasor corresponding to a local measurement of an electric power delivery system, status information, and/or the like. A request for the desired information may be transmitted 504 to the server IED. The request may be addressed to the server IED and may indicate the information that is desired from the server IED.

If a failure in the resilient communication network has occurred, the request may not reach the server IED and no response may be transmitted by the server IED. It may be determined 506 that a response has not been received from the server IED. For example, a response timer may time out and/or additional requests for the requested information may also fail to generate a response. After it is determined 506 that a response has not been received, the information may be requested 508 from a second client controller. The request to the server IED may be repeated to the second client controller, and/or a differently formatted request may be sent to the second client controller. For example, information for a plurality of server IEDs may be requested in a single communication from the second client controller.

The requested information may be received 510 from the second client controller. The second client controller may request information from the server IED using an alternate communication path, so it may have an up-to-date version of the requested information. The method 500 may be repeated whenever new information is needed. Alternatively, or in addition, information may be requested directly from the second client controller once a response has not been received until an indication is received that the network failure has been remedied.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure. The scope of the present disclosure should, therefore, be determined only by the following claims.

The invention claimed is:

1. A system for providing resilient monitoring of an electric power delivery system, the system comprising:
   a first client controller;
   a second client controller communicatively coupled to the first client controller;
   first and second client radios, wherein each client radio is communicatively coupled to the first client controller and the second client controller;
   a plurality of server intelligent electronic devices (IEDs), each server IED communicatively coupled to first and second server radios,
   wherein each of the server radios is configured to communicatively couple to at least one other radio using a plurality of data channels, and
   wherein each server IED is communicatively coupled to the first and second client controllers by a plurality of communication paths;
   wherein the plurality of communication paths comprise a first loop communication path including client radios and server radios communicating in a first direction and a second loop communication path including client radios and server radios communicating in a second direction.

2. The system of claim 1, wherein each server IED is directly communicatively coupled by the first server radio to a first neighbor and by the second server radio to a second neighbor.

3. The system of claim 2, wherein the first server radio is configured to provide communications received from the first neighbor to the second server radio for transmission to the second neighbor.

4. The system of claim 3, wherein the first server radio of at least one server IED provides the communications to the second server radio by providing the communications to the at least one server IED for forwarding to the second server radio, and wherein the at least one server IED is configured to forward to the second server radio communications not destined for the at least one server IED.

5. The system of claim 1, wherein a first communication path couples the first client controller to each of the plurality of server IEDs, and wherein a second communication path couples the second client controller to each of the plurality of server IEDs.

6. The system of claim 1, wherein the plurality of server IEDs are communicatively coupled in a loop topology.

7. The system of claim 6, wherein each server radio is configured to use a first data channel to communicate requests in a first loop direction and a second data channel to communicate requests in a second loop direction.

8. The system of claim 1, wherein the first client controller is configured to:
 determine that a request for information sent to a first server IED failed to generate a response; and
 request the information from the second client controller.

9. The system of claim 1, wherein the first and second client controllers perform duplicative functions.

10. The system of claim 1, wherein each of the plurality of data channels carries a supervisory control and data acquisition (SCADA) protocol.

11. The system of claim 1, wherein at least one server IED is out of range of direct communication from the first and second client controllers.

12. The system of claim 1, wherein the plurality of data channels between a first server IED and a second server IED are carried on a single wireless coupling.

13. A first automation control device for monitoring an electric power delivery system, the device comprising:
 a processor;
 a communication interface coupleable to a second automation control device and first and second radios, the second automation control device in communication with the first and second radios; and
 a memory comprising a data gathering module for gathering monitored system data from a plurality of intelligent electronic devices (IEDs) using a first radio communication path, the data gathering module configured to:
  detect a communicative coupling to the second automation control device, wherein the second automation control device is communicatively coupled to the plurality of IEDs by a second radio communication path independent from the first radio communication path,
  transmit a request for information to at least one of the plurality of IEDs using at least one of the first and second radios,
  determine that no response was received to the request for information, and
  request the information from the second automation control device.

14. A method for providing resilient communication among monitoring devices for an electric power delivery system, the method comprising:
 communicatively coupling each of a first and a second client radio with a client control system;
 communicatively coupling each of a plurality of server radio pairs to a corresponding server intelligent electronic device (IED); and
 communicatively coupling each server radio in each server radio pair to at least one other radio, wherein communicatively coupling each server radio comprises communicatively coupling the plurality of server radio pairs in a loop topology;
 wherein the plurality of server radio pairs provide a plurality of communications paths between each server IED and the client control system;
 wherein the plurality of communication paths comprise a first loop communication path including client radios and server radios communicating in a first direction and a second loop communication path including client radios and server radios communicating in a second direction.

15. The method of claim 14, further comprising communicatively coupling a first server radio in a first server radio pair to a second server radio in the first server radio pair, wherein the second server radio transmits communications received by the first server radio.

16. The method of claim 14, wherein the client control system comprises a plurality of automation controllers.

17. The method of claim 14, wherein communicatively coupling each server radio comprises coupling a plurality of data channels between each server radio and the at least one other radio.

18. The method of claim 17, wherein the plurality of data channels are carried over a single wireless coupling.

19. The method of claim 17, wherein each server radio is configured to use a first data channel to communicate requests in a first loop direction and a second data channel to communicate requests in a second loop direction.

20. The method of claim 17, wherein each of the plurality of data channels carries a supervisory control and data acquisition (SCADA) protocol.

21. The method of claim 14, wherein at least one server IED is out of range of direct communication from the client control system.

22. A first automation control device for monitoring an electric power delivery system, the device comprising:
 a processor;
 a communication interface coupleable to a second automation control device and first and second radios; and
 a memory comprising a data gathering module for gathering monitored system data from a plurality of intelligent electronic devices (IEDs) using a first radio communication path, the data gathering module configured to:
  detect a communicative coupling to the second automation control device, wherein the second automation control device is communicatively coupled to the plurality of IEDs by a second radio communication path independent from the first radio communication path,
  transmit a request for information to at least one of the plurality of IEDs using at least one of the first and second radios and the first radio communication path,
  determine that no response was received to the request for information by the first automation control device, and
  transmit a request to the second automation control device for the information received by the second automation control device from the at least one of the plurality of IEDs; and
  receive the information from the second automation control device.

* * * * *